United States Patent
Melanson et al.

(10) Patent No.: US 9,025,347 B2
(45) Date of Patent: May 5, 2015

(54) SWITCHING PARAMETER BASED DISCONTINUOUS MODE-CRITICAL CONDUCTION MODE TRANSITION

(75) Inventors: John L. Melanson, Austin, TX (US); Zhaohui He, Austin, TX (US)

(73) Assignee: Cirrus Logic, Inc., Austin, TX (US)

(*) Notice: Subject to any disclaimer, the term of this patent is extended or adjusted under 35 U.S.C. 154(b) by 566 days.

(21) Appl. No.: 13/328,801

(22) Filed: Dec. 16, 2011

(65) Prior Publication Data

US 2012/0153858 A1 Jun. 21, 2012

Related U.S. Application Data

(60) Provisional application No. 61/423,883, filed on Dec. 16, 2010.

(51) Int. Cl.
*H02M 3/315* (2006.01)
*H02M 3/335* (2006.01)
(Continued)

(52) U.S. Cl.
CPC .. *H02M 3/33523* (2013.01); *H02M 2001/0003* (2013.01); *H02M 2001/007* (2013.01); *H05B 33/0815* (2013.01)

(58) Field of Classification Search
CPC ................................. H02M 3/22; H02M 3/335
USPC .............. 363/15–17, 19, 21.01, 21.02, 21.07, 363/21.08, 21.09
See application file for complete search history.

(56) References Cited

U.S. PATENT DOCUMENTS

| 4,523,128 A | 6/1985 | Stamm et al. |
| 5,055,746 A | 10/1991 | Hu et al. |

(Continued)

FOREIGN PATENT DOCUMENTS

| CN | 1459216 A | 11/2004 |
| CN | 1843061 A1 | 10/2006 |

(Continued)

OTHER PUBLICATIONS

Brkovic, Milivoje, Automatic Current Shaper with Fast Output Regulation and Soft-Switching, Telecommunications Energy Conference, INTELEC '93. 15th International, Sep. 27-30, 1993, pp. 379-386, vol. 1, California Institute Technology, Pasadena, California USA.

(Continued)

*Primary Examiner* — Minh D A
(74) *Attorney, Agent, or Firm* — Terrile, Cannatti, Chambers & Holland, LLP; Kent B. Chambers

(57) ABSTRACT

An electronic system includes a controller to provide at least dual-mode conduction control of a switching power converter. In at least one embodiment, the controller is capable to control transitions between discontinuous conduction mode (DCM) and critical conduction mode (CRM) of the switching power converter using a measured switching time parameter having a value corresponding with an approximately peak voltage of a time-varying supply voltage supplied to the switching power converter. In at least one embodiment, the controller dynamically compensates for changing parameters of the electronic system by dynamically determining a minimum non-conductive time of the control switch of the switching power converter using the measured switching time parameter value at approximately the peak of the supply voltage of the supply voltage.

28 Claims, 14 Drawing Sheets

(51) Int. Cl.
  *H05B 33/08* (2006.01)
  *H02M 1/00* (2006.01)

(56) References Cited

U.S. PATENT DOCUMENTS

| | | |
|---|---|---|
| 5,319,301 A | 6/1994 | Callahan et al. |
| 5,321,350 A | 6/1994 | Haas |
| 5,430,635 A | 7/1995 | Liu |
| 5,691,605 A | 11/1997 | Xia et al. |
| 5,770,928 A | 6/1998 | Chansky et al. |
| 6,043,635 A | 3/2000 | Downey |
| 6,046,550 A | 4/2000 | Ference et al. |
| 6,091,205 A | 7/2000 | Newman et al. |
| 6,211,624 B1 | 4/2001 | Holzer |
| 6,229,292 B1 | 5/2001 | Redl et al. |
| 6,380,692 B1 | 4/2002 | Newman et al. |
| 6,407,514 B1 | 6/2002 | Glaser et al. |
| 6,510,995 B2 | 1/2003 | Muthu et al. |
| 6,621,256 B2 * | 9/2003 | Muratov et al. ............... 323/282 |
| 6,713,974 B2 | 3/2004 | Patchornik et al. |
| 6,724,174 B1 | 4/2004 | Esteves et al. |
| 6,734,639 B2 | 5/2004 | Chang et al. |
| 6,858,995 B2 | 2/2005 | Lee et al. |
| 6,900,599 B2 | 5/2005 | Ribarich |
| 6,940,733 B2 | 9/2005 | Schie et al. |
| 7,099,163 B1 | 8/2006 | Ying |
| 7,102,902 B1 | 9/2006 | Brown et al. |
| 7,145,295 B1 | 12/2006 | Lee et al. |
| 7,180,250 B1 | 2/2007 | Gannon |
| 7,184,937 B1 | 2/2007 | Su et al. |
| 7,276,861 B1 | 10/2007 | Shteynberg et al. |
| 7,310,244 B2 | 12/2007 | Yang et al. |
| 7,388,764 B2 | 6/2008 | Huynh et al. |
| 7,642,762 B2 | 1/2010 | Xie et al. |
| 7,656,103 B2 | 2/2010 | Shteynberg et al. |
| 7,710,047 B2 | 5/2010 | Shteynberg et al. |
| 7,719,246 B2 | 5/2010 | Melanson |
| 7,719,248 B1 | 5/2010 | Melanson |
| 7,728,530 B2 | 6/2010 | Wang et al. |
| 7,733,678 B1 | 6/2010 | Notohamiprodjo et al. |
| 7,759,881 B1 | 7/2010 | Melanson |
| 7,786,711 B2 * | 8/2010 | Wei et al. ...................... 323/224 |
| 7,804,256 B2 | 9/2010 | Melanson |
| 7,852,017 B1 | 12/2010 | Melanson |
| 7,872,427 B2 | 1/2011 | Scianna |
| 7,880,400 B2 | 2/2011 | Zhou et al. |
| 8,102,167 B2 | 1/2012 | Irissou et al. |
| 8,115,419 B2 | 2/2012 | Given et al. |
| 8,169,154 B2 | 5/2012 | Thompson et al. |
| 8,212,491 B2 | 7/2012 | Kost |
| 8,212,492 B2 | 7/2012 | Lam et al. |
| 8,222,832 B2 | 7/2012 | Zheng et al. |
| 8,482,220 B2 | 7/2013 | Melanson |
| 8,536,794 B2 | 9/2013 | Melanson et al. |
| 8,569,972 B2 | 10/2013 | Melanson |
| 8,749,173 B1 | 6/2014 | Melanson et al. |
| 2002/0140371 A1 | 10/2002 | Chou et al. |
| 2004/0105283 A1 | 6/2004 | Schie et al. |
| 2004/0212321 A1 | 10/2004 | Lys |
| 2006/0022648 A1 | 2/2006 | Ben-Yaakov et al. |
| 2006/0022916 A1 | 2/2006 | Aiello |
| 2006/0208669 A1 | 9/2006 | Huynh et al. |
| 2006/0214603 A1 | 9/2006 | Oh |
| 2006/0261754 A1 | 11/2006 | Lee |
| 2006/0285365 A1 | 12/2006 | Huynh |
| 2007/0024213 A1 | 2/2007 | Shteynberg |
| 2007/0170873 A1 | 7/2007 | Mishima |
| 2007/0182338 A1 | 8/2007 | Shteynberg |
| 2007/0182347 A1 | 8/2007 | Shteynberg |
| 2007/0285031 A1 | 12/2007 | Shteynberg |
| 2008/0018261 A1 | 1/2008 | Kastner |
| 2008/0143266 A1 | 6/2008 | Langer |
| 2008/0174291 A1 | 7/2008 | Hansson |
| 2008/0192509 A1 | 8/2008 | Dhuyvetter et al. |
| 2008/0205103 A1 | 8/2008 | Sutardja et al. |
| 2008/0224629 A1 | 9/2008 | Melanson |
| 2008/0224633 A1 | 9/2008 | Melanson |
| 2008/0224636 A1 | 9/2008 | Melanson |
| 2008/0259655 A1 | 10/2008 | Wei |
| 2009/0134817 A1 | 5/2009 | Jurngwirth et al. |
| 2009/0195186 A1 | 8/2009 | Guest et al. |
| 2009/0284182 A1 | 11/2009 | Cencur |
| 2010/0002480 A1 | 1/2010 | Huynh et al. |
| 2010/0013405 A1 | 1/2010 | Thompson |
| 2010/0013409 A1 | 1/2010 | Quek et al. |
| 2010/0066328 A1 * | 3/2010 | Shimizu et al. ............... 323/282 |
| 2010/0141317 A1 | 6/2010 | Szajnowski |
| 2010/0164406 A1 | 7/2010 | Kost et al. |
| 2010/0213859 A1 | 8/2010 | Shteynberg et al. |
| 2010/0231136 A1 | 9/2010 | Reisenauer et al. |
| 2010/0238689 A1 | 9/2010 | Fei et al. |
| 2010/0244726 A1 | 9/2010 | Melanson |
| 2011/0043133 A1 | 2/2011 | Van Laanen et al. |
| 2011/0080110 A1 | 4/2011 | Nuhfer et al. |
| 2011/0084622 A1 | 4/2011 | Barrow et al. |
| 2011/0084623 A1 | 4/2011 | Barrow |
| 2011/0115395 A1 | 5/2011 | Barrow et al. |
| 2011/0121754 A1 | 5/2011 | Shteynberg |
| 2011/0148318 A1 | 6/2011 | Shackle et al. |
| 2011/0204797 A1 | 8/2011 | Lin et al. |
| 2011/0204803 A1 | 8/2011 | Grotkowski et al. |
| 2011/0234115 A1 | 9/2011 | Shimizu et al. |
| 2011/0266968 A1 | 11/2011 | Bordin et al. |
| 2011/0291583 A1 | 12/2011 | Shen |
| 2011/0309759 A1 | 12/2011 | Shteynberg et al. |
| 2012/0049752 A1 | 3/2012 | King et al. |
| 2012/0068626 A1 | 3/2012 | Lekatsas et al. |
| 2012/0098454 A1 | 4/2012 | Grotkowski et al. |
| 2012/0133291 A1 | 5/2012 | Kitagawa et al. |
| 2010/0218357 A1 | 7/2012 | Fan |
| 2012/0286686 A1 | 11/2012 | Watanabe et al. |
| 2013/0015768 A1 | 1/2013 | Roberts et al. |
| 2013/0154495 A1 | 6/2013 | He |
| 2014/0009082 A1 | 1/2014 | King et al. |

FOREIGN PATENT DOCUMENTS

| | | |
|---|---|---|
| EP | 0636889 | 1/1995 |
| EP | 1164819 | 12/2001 |
| EP | 2144356 A1 | 1/2010 |
| EP | 2232949 | 9/2010 |
| EP | 2257124 A1 | 12/2010 |
| JP | 2008053181 A | 3/2008 |
| JP | 2009170240 A | 7/2009 |
| WO | 9917591 | 4/1999 |
| WO | 02096162 A1 | 11/2002 |
| WO | 2004051834 A1 | 6/2004 |
| WO | 2006079937 | 8/2006 |
| WO | 2008004008 A2 | 1/2008 |
| WO | 2008029108 | 3/2008 |
| WO | 2008112822 A2 | 9/2008 |
| WO | 2010011971 A1 | 1/2010 |
| WO | 2010035155 A2 | 4/2010 |
| WO | 2010065598 | 10/2010 |
| WO | 2011008635 A1 | 1/2011 |
| WO | 2011050453 A1 | 5/2011 |
| WO | 2011056068 A2 | 5/2011 |
| WO | 2012016197 A1 | 2/2012 |
| WO | 2010027493 A2 | 3/2012 |

OTHER PUBLICATIONS

Dilouie, Craig, Introducing the LED Driver, Electrical Construction & Maintenance (EC&M), Sep. 1, 2004, ,pp. 28-32, Zing Communications, Inc., Calgary, Alberda, Canada.

Spiazzi, Giorgio, Simone Buso and Gaudenzio Meneghesso, Analysis of a High-Power-Factor Electronic Ballast for High Brightness Light Emitting Diode, Power Electronics Specialist Conference, 2005. PESC '05, IEEE 36th, pp. 1494-1499, 2005, Dept. of Information Engineering, University of Padova, Padova, Italy.

Supertex Inc, 56W Off-line LED Driver, 120VAC with PFC, 160V, 350mA Load, Dimmer Switch Compatible, DN-H05, pp. 1-20, Jun. 17, 2008, Sunnyvale, California, USA.

(56) References Cited

OTHER PUBLICATIONS

International Search Report and Written Opinion issued on Nov. 2, 2012 in the corresponding PCT Application No. PCT/US11/65593.
Azoteq, IQS17 Family, IQ Switch—ProxSense Series, Touch Sensor, Load Control and User Interface, IQS17 Datasheet V2.00.doc, Jan. 2007, pp. 1-51, Azoteq (Pty) Ltd., Paarl, Western Cape, Republic of South Africa.
Chan, Samuel, et al, Design and Implementation of Dimmable Electronic Ballast Based on Integrated Inductor, IEEE Transactions on Power Electronics, vol. 22, No. 1, Jan. 2007, pp. 291-300, Dept. of Electron. Eng., City Univ. of Hong Kong.
Rand, Dustin, et al, Issues, Models and Solutions for Triac Modulated Phase Dimming of LED Lamps, Power Electronics Specialists Conference, 2007. PESC 2007. IEEE, Jun. 17-21, 2007, pp. 1398-1404, Boston, MA, USA.
Gonthier, Laurent, et al, EN55015 Compliant 500W Dimmer with Low-Losses Symmetrical Switches, ST Microelectronics, Power Electronics and Applications, 2005 European Conference, pp. 1-9, Aug. 7, 2006, Dresden.
Green, Peter, A Ballast That Can Be Dimmed from a Domestic (Phase Cut) Dimmer, International Rectifier, IRPLCFL3 rev.b, pp. 1-12, Aug. 15, 2003, El Segundo, California, USA.
Hausman, Don, Real-Time Illumination Stability Systems for Trailing-Edge (Reverse Phase Control) Dimmers, Lutron RTISS, Lutron Electronics Co, Dec. 2004, pp. 1-4, Coopersburg, PA, USA.
Lee, Stephen, et al, A Novel Electrode Power Profiler for Dimmable Ballasts Using DC Link Voltage and Switching Frequency Controls, IEEE Transactions on Power Electronics, vol. 19, No. 3, May 2004, pp. 847-833, City University of Hong Kong.
Engdahl, Tomi, Light Dimmer Circuits, 1997-2000, www.epanorama.net.
O'Rourke, Conan, et al, Dimming Electronic Ballasts, National Lighting Product Information Program, Specifier Reports, vol. 7, No. 3, Oct. 1999, pp. 1-24, Troy, NY, USA.
Why Different Dimming Ranges, http://www.lutron.com/TechnicalDocumentLibrary/LutronBallastpg3.pdf.
Wu, Tsai-Fu, et al, Single-Stage Electronic Ballast with Dimming Feature and Unity Power Factor, IEEE Transactions on Power Electronics, vol. 13, No. 3, May 1998, pp. 586-597.
Amanci, et al, "Synchronization System with Zero-Crossing Peak Detection Algorithm for Power System Applications", The 2010 International Power Electronics Conference, pp. 2984-2991, Toronto, Ontario, Canada.
Patterson, James, "Efficient Method for Interfacing Triac Dimmers and LEDs", National Semiconductor Corp., pp. 29-32, Jun. 23, 2011, USA.
Vainio, Olli, "Digital Filtering for Robust 50/60 Hz Zero-Crossing Detectors", IEEE Transactions on Instrumentation and Measurement, vol. 45, No. 2, pp. 426-430, Apr. 1996, University of Santa Barbara, California, USA.

\* cited by examiner

SWITCHING PARAMETER BASED DISCONTINUOUS MODE-CRITICAL CONDUCTION MODE TRANSITION

CROSS-REFERENCE TO RELATED APPLICATION

This application claims the benefit under 35 U.S.C. §119 (e) and 37 C.F.R. §1.78 of U.S. Provisional Application No. 61/423,883, filed on Dec. 16, 2010, and is incorporated by reference in its entirety.

BACKGROUND OF THE INVENTION

1. Field of the Invention

The present invention relates in general to the field of electronics, and more specifically to a method and system for determining and utilizing a switching parameter of a switching power converter to facilitate transitions between discontinuous conduction mode and critical conduction mode.

2. Description of the Related Art

Many electronic systems include circuits, such as switching power converters to provide efficient power conversion from a voltage supply into a regulated output voltage. When converting an alternating current ("AC") supply voltage into a regulated output voltage, switching power converters utilize a switch that turns ON and OFF multiple times during a single cycle of the AC supply voltage. The ratio of the ON time of the switch to the OFF time correlates to an average power conversion. Improving the energy efficiency of electrical circuits, including switching power converters, continues to be a high priority for many entities including many companies and countries.

Switching power converters generally operate in one of three different modes: discontinuous conduction mode ("DCM"), critical conduction mode ("CRM"), and continuous conduction mode ("CCM"). CCM tends to be used by switching power converters in higher power, e.g. 300+W, applications. In lower power applications, switching power converters tend to use DCM and/or CRM operational modes. A rectified AC supply voltage rises from zero volts (0V) to a peak voltage, returns to 0V, and repeats. The switch in the switching power converter cycles many times during a single cycle of the rectified AC supply voltage. For example, the switching frequency of the switch is often between 20 kHz and 100 kHz while the frequency of a rectified AC supply voltage is generally between 100 Hz and 120 Hz. Due to, for example, higher switching frequencies at lower voltages in CRM, DCM tends to be more efficient than CRM during the lower voltages of a cycle of the rectified AC supply voltage. Due to, for example, higher conduction losses in DCM at higher voltages, CRM tends to be more efficient than DCM at higher voltages of the rectified AC supply voltage cycle.

FIG. 1 depicts an electronic system 100 that operates in dual conduction mode to take advantage of DCM efficiencies at lower supply voltages and CRM at higher supply voltages. The electronic system 100 receives an AC supply voltage $V_{SUPPLY}$ from voltage supply 102. The supply voltage $V_{IN}$ is, for example, a nominally 60 Hz/110 V line voltage in the United States of America or a nominally 50 Hz/220 V line voltage in Europe and the People's Republic of China. An optional dimmer 104 phase cuts leading and/or trailing edges of the supply voltage $V_{SUPPLY}$. The input voltage $V_{IN}$ represents the supply voltage $V_{SUPPLY}$ in the absence of phase cutting by the dimmer 104 and represents a phase cut voltage if dimmer 104 phase cuts the supply voltage $V_{SUPPLY}$. A full-bridge diode rectifier 106 rectifies the input voltage $V_{IN}$ and an electromagnetic interference (EMI) filter 108 attenuates high frequency interference of the switching power converter 112 to generate a rectified input voltage $V_X$. The controller 111 generates a switch control signal $CS_1$ to control the switching power converter 112. The control signal $CS_1$ controls the conductivity of field effect transistor (FET) switch 114 to control the primary current $i_P$ to meet the power demands of load 116. For an n-channel FET, the FET conducts (i.e. ON) when during a pulse of the switch control signal $CS_1$ and is nonconductive (i.e. OFF) when the pulse of the switch control signal $CS_1$ ends.

FIG. 2 depicts waveforms 200 associated with a switching power converter 112. Referring to FIGS. 1 and 2, when the FET 114 conducts during a primary charging time period T1, the primary current $i_P$ ramps up through the primary coil 118 of transformer 120. The dot convention of transformer 120 and the diode 122 prevent flow of the secondary current $i_S$ during the period T1. When the controller 111 generates the switch control signal $CS_1$ to turn FET 114 OFF and period T1 thereby ends, the primary current $i_P$ falls to 0, and the voltage across the primary coil 118 reverses (also referred to as "flyback"). During the flyback period T2, the secondary current $i_S$ quickly rises and then decays. In DCM and CRM, the flyback period T2 ends when the secondary current $i_S$ reaches zero. In DCM, the controller 111 waits for an idle period T3 before beginning a new period TT of the switch control signal $CS_1$ with a pulse of switch control signal $CS_1$. In CRM, as soon as the secondary current $i_S$ ends, the controller 111 begins a new period TT of the switch control signal and the primary current $i_P$ again ramps up until the end of the period T1.

For each period TT of the switch control signal $CS_1$, the primary charging period T1 equals the duration of the pulse of the switch control signal $CS_1$. Since the controller 111 controls the duration of the pulse of the switch control signal $CS_1$, the controller 111 controls the duration of the charging period T1. The duration of the flyback period T2 is a function of several variables such as parasitic resistances on the secondary side of the transformer 120, such as parasitic resistances of the secondary coil 124, diode 122, capacitor 126, and the secondary current $i_S$ drawn by the load 116.

FIG. 3 depicts exemplary waveforms 300 associated with the electronic system 100 for two cycles of the rectified input voltage $V_X$, i.e. for two half-line cycles of the supply voltage $V_{SUPPLY}$. The waveforms 300 includes superimposed waveforms for the rectified input voltage $V_X$, a representative primary current $i_P$, and representative secondary current $i_S$. The waveforms 300 also include a representative depiction of the switch control signal $CS_1$. The term "representative" is used because typically the frequency of the switch control signal $CS_1$ is 20 kHz to 100 kHz and the frequency of the rectified input voltage $V_X$ is 100 Hz to 120 Hz. Thus, for clarity only a subset of the pulses of the switch control signal $CS_1$ and resulting primary current $i_P$ and secondary current $i_S$ waveforms are shown in the waveforms 300.

Referring to FIGS. 1, 2, and 3, the controller 111 controls the switching power converter 112 to provide power factor correction in addition to regulating the primary side current $i_P$. To provide power factor correction, the controller 111 attempts to make the circuit appear resistive to the voltage supply 102 and, thus, create a linear relationship between the primary current $i_P$ and the rectified input voltage $V_X$. Thus, as the voltage $V_X$ rises at the beginning of the first charging period T1, the controller 111 generates a pulse of the switch control signal $CS_1$. The controller 111 monitors the rectified input voltage $V_X$ via feedforward path 128, and the primary current $i_P$ rises during the charging period T1 in correlation with a near instantaneous value of the rectified input voltage $V_X$. The controller 111 also monitors the secondary current $i_S$ and, thus, the flyback period T2 via feedback path 130 to determine the power demand of load 116 and to regulate the secondary current $i_S$ in accordance with the power demand of load 116.

The charging period T1 and the flyback period T2 are shorter nearer to the zero crossings of the rectified input voltage $V_X$. Zero crossings of the rectified input voltage $V_X$ occur in FIG. 3 at times $t_0$, $t_1$, and $t_2$. Since the period TT of the switch control signal $CS_1$ during CRM is T1+T2, the switching frequency 1/TT of the FET 114 would be highest for lower values of the rectified input voltage $V_X$. Higher switching frequencies can correspond to higher switching losses and, thus, lower efficiency. The frequency of the switch control signal $CS_1$ during DCM is 1/(T1+T2+T3). Adding the idle time T3 to the period TT of the switch control signal $CS_1$ decreases the frequency and, thus, increases the efficiency of the FET 114 during DCM. As the rectified input voltage $V_X$ increases, the flyback period T2 increases. As the flyback period T2 increases, the frequency of the switch control signal $CS_1$ decreases while transferring more energy to the load 116. Since CRM is more efficient at higher voltages, the controller 111 generates the switch control signal $CS_1$ to operate the switching power converter 112 in CRM at higher values of the rectified input voltage $V_X$. The instantaneous pulses of the primary current $i_P$ result in an average primary current $i_{P\_AVG}$ that is intended to linearly track the rectified input voltage $V_X$.

FIG. 4 depicts a period versus voltage graph 400 that represents DCM and CRM periods TT of switch control signal $CS_1$ relative to the rectified input voltage $V_X$. Referring to FIGS. 1, 3, and 4, the controller 111 includes a DCM/CRM fixed minimum period TT module 132 to determine when to transition between DCM and CRM operation of switching power converter 112. The DCM/CRM fixed minimum period TT module 132 is configured to always enforce a fixed minimum period $TT_{MIN}$ by generating a DCM/CRM transition signal, which controls whether the controller 111 operates the switching power converter 112 in DCM or CRM. The minimum $TT_{MIN}$ determines a transition point between DCM and CRM operation at $V_{X\_TRANS}$. Thus, the controller 111 operates the switching power converter 112 in CRM as long as the period TT is greater than the fixed minimum period $TT_{MIN}$ and otherwise operates the switching power converter 112 in DCM. The fixed minimum period $TT_{MIN}$ is unresponsive to changes in operating parameters of the electronic system 100 but is relatively simple to enforce since the controller 111 determines the charging period T1 and the DCM/CRM fixed minimum period TT module 132 monitors the flyback period T2 via feedback path 130.

It is desirable to improve efficiency of switching power converters.

SUMMARY OF THE INVENTION

In at least one embodiment of the present invention, an apparatus includes a controller to provide at least dual-mode conduction control of a switching power converter. The controller is capable of controlling transitions between discontinuous conduction mode and critical conduction mode of the switching power converter using a measured switching time parameter having a value corresponding with an approximately peak voltage of a time-varying supply voltage supplied to the switching power converter.

In another embodiment of the present invention, a method includes providing at least dual-mode conduction control of a switching power converter. Providing at least dual-mode conduction control of a switching power converter includes controlling transitions between discontinuous conduction mode and critical conduction mode of the switching power converter using a measured switching time parameter having a value corresponding with an approximately peak voltage of a time-varying supply voltage supplied to the switching power converter.

In a further embodiment of the present invention, an apparatus includes a switching power converter. The apparatus further includes a controller, coupled to the switching power converter, to provide at least dual-mode conduction control of the switching power converter. The controller is capable of controlling transitions between discontinuous conduction mode and critical conduction mode of the switching power converter using a measured switching time parameter having a value corresponding with an approximately peak voltage of a time-varying supply voltage supplied to the switching power converter. The controller is further capable of controlling power factor correction for the switching power converter. The apparatus also includes a load coupled to the switching power converter.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
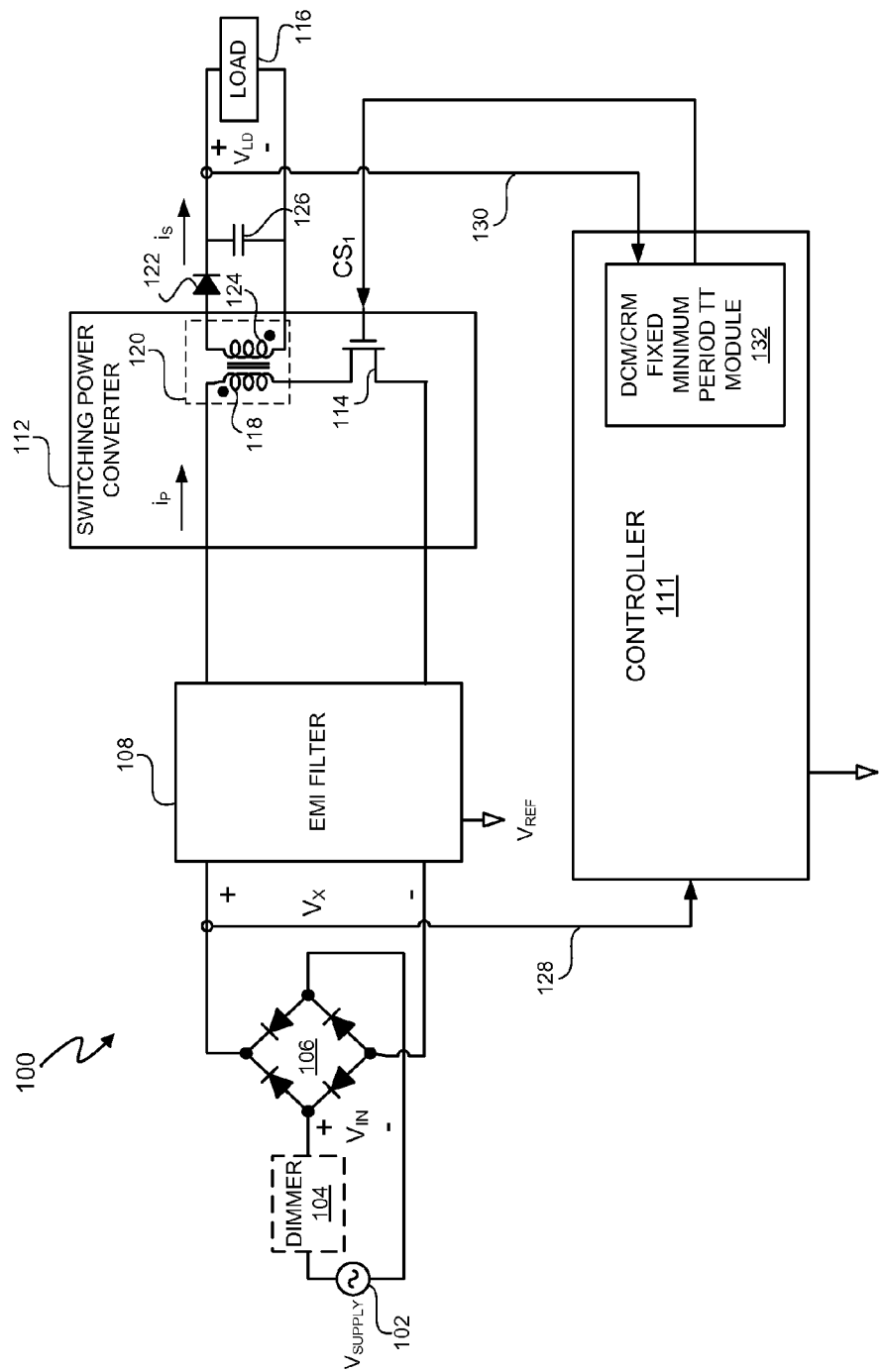
FIG. 1 (labeled prior art) depicts a electronic system that operates in discontinuous conduction mode (DCM) and critical conduction mode (CRM).

In at least one embodiment, an electronic system includes a controller to provide at least dual-mode conduction control of a switching power converter. "At least dual-mode conduction control" means, in at least one embodiment, providing control for at least two modes of conduction such as two or more of discontinuous conduction mode (DCM), critical conduction mode (CRM), and continuous conduction mode (CCM). In at least one embodiment, the controller is capable to control transitions between DCM and CRM of the switching power converter using a measured switching time parameter having a value corresponding with an approximately peak voltage of a time-varying supply voltage supplied to the switching power converter. In at least one embodiment, the switching power converter includes a transformer that includes a primary side coil and a secondary side coil. The transformer transfers energy to a load. In at least one embodiment, the measured switching time parameter value used by the controller to control transitions between DCM and CRM of the switching power converter is a flyback time on the secondary side of the transformer that occurs at approximately a peak voltage of a time-varying supply voltage.

During operation and over time, various operating parameters in a switching power converter can change. For example, components can degrade over time and exhibit more or less resistance. Supply voltage levels in the electronic system can change due to relocation to a different country or when a dimmer phase cuts and, thus, modifies the supply voltage to the switching power converter. In at least one embodiment, the controller dynamically compensates for changing parameters of the electronic system by dynamically determining a minimum non-conductive time of the control switch of the switching power converter using the measured switching time parameter value at approximately the peak of the supply voltage of the supply voltage. The non-conductive time equals the flyback period plus, in at least one embodiment, any desired idle time.

The longest flyback time of the switching power converter occurs at the peak supply voltage because at the peak supply voltage the most energy is available for transfer to a load. In at least one embodiment, the controller determines a maximum flyback time for a particular cycle of the supply voltage. The maximum flyback time is a function of the supply voltage and many other variables that affect the decay of a secondary-side transformer current. The other variables affecting the maximum flyback time include component effects such as parasitic resistances and load resistance. Thus, peak supply voltage changes, components, and other variables affect the flyback time, and the maximum flyback time will automatically take into account these variables. The controller then utilizes a fraction of the maximum flyback time to determine a minimum flyback time. In at least one embodiment, the controller then adds a desired idle time to the determined minimum flyback time to generate a minimum non-conductive time for each cycle of the control switch of the switching power converter. The minimum conductive time sets a transition point between operation in DCM and CRM. Thus, in at least one embodiment, by dynamically determining the minimum non-conductive time of the control switch based on a dynamically determined maximum flyback time, the controller accounts for variables affecting the flyback time in determining the minimum non-conductive time. In at least one embodiment, accounting for these flyback time-affecting variables allows the controller to control transitions between DCM and CRM to operate more efficiently.

In at least one embodiment, the controller is capable of controlling transfer of energy from a primary-side coil of the switching power converter to a secondary side coil and the measured switching time parameter value is a minimum flyback time of the secondary side coil corresponding to a fraction of a maximum flyback time for a particular cycle of the supply voltage. In at least one embodiment, the controller is capable of transitioning the switching power converter from discontinuous conduction mode to critical conduction mode when the flyback time is greater than the minimum flyback time. The controller is further capable of transitioning the switching power converter from critical conduction mode to discontinuous conduction mode when the flyback time is less than the minimum flyback time.

Figure 5:
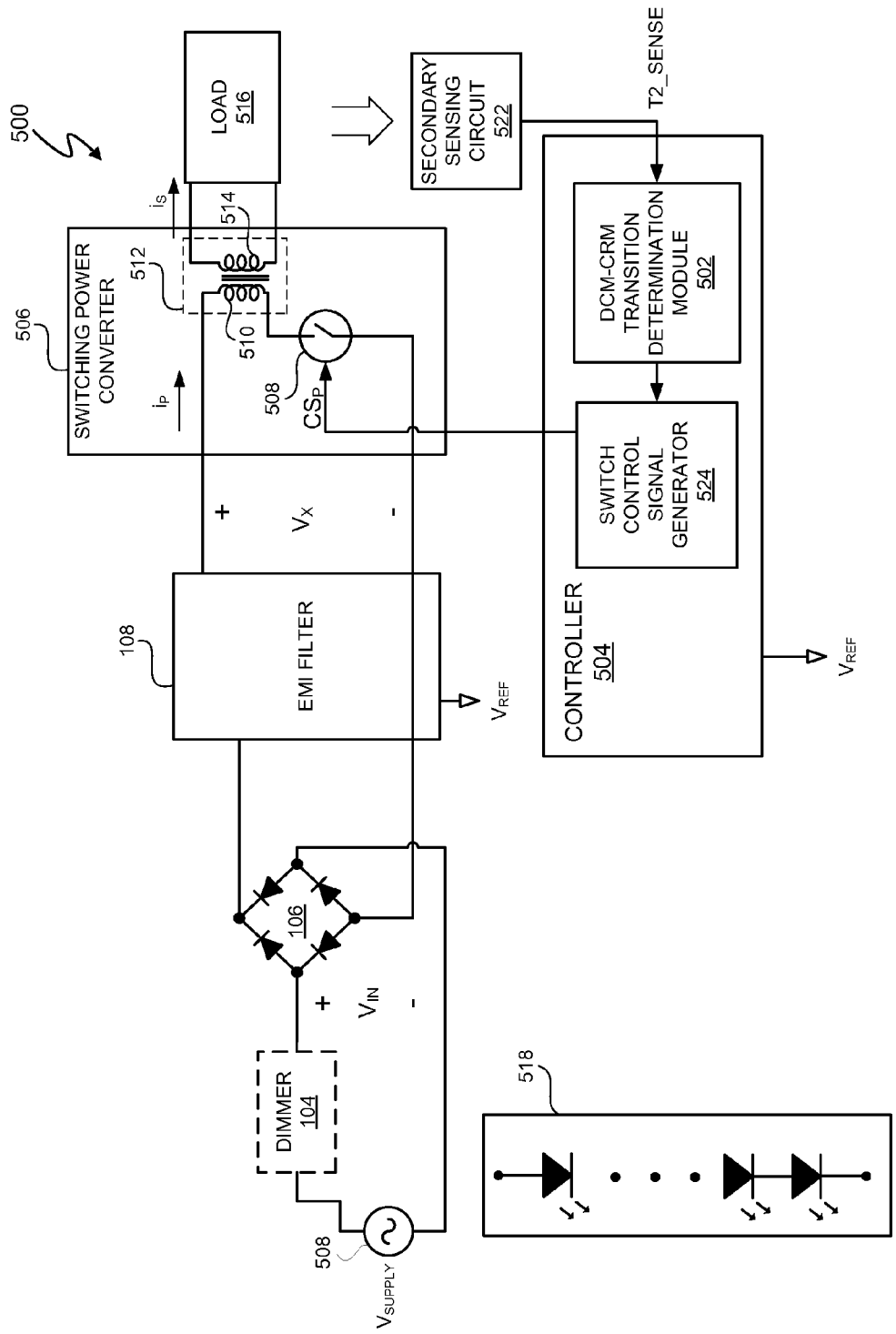
FIG. 5 depicts an electronic system that includes a DCM-CRM transition determination module 502 to dynamically determine a minimum non-conductive time of a switch control signal for a switching power converter.

FIG. 5 depicts an electronic system 500 that includes a DCM-CRM transition determination module 502 in controller 504 to dynamically determine a minimum non-conductive time of a switch control signal for the switching power converter 506. In at least one embodiment, the DCM-CRM transition determination module 502 utilizes a switching based parameter to determine when to transition operation of the switching power converter 506 between DCM and CRM. The electronic system 500 receives an AC supply voltage $V_{SUPPLY}$ from voltage supply 508. The voltage supply 508 can be any voltage supply, such as a mains utility voltage. The supply voltage $V_{IN}$ is, for example, a nominally 60 Hz/110 V line voltage in the United States of America or a nominally 50 Hz/220 V line voltage in Europe and the People's Republic of China. An optional dimmer 104 phase cuts leading and/or trailing edges of the supply voltage $V_{SUPPLY}$. The input voltage $V_{IN}$ represents the supply voltage $V_{SUPPLY}$ in the absence of phase cutting by the dimmer 104 and represents a phase cut voltage if dimmer 104 phase cuts the supply voltage $V_{SUPPLY}$. A full-bridge diode rectifier 106 rectifies the input voltage $V_{IN}$ and an electromagnetic interference (EMI) filter 108 attenuates high frequency interference of the switching power converter 112 to generate a rectified input voltage $V_X$. The rectified input voltage $V_X$ represents one embodiment of a time-varying supply voltage supplied to the switching power converter 506.

The controller 504 also generates a switch control signal $CS_P$ to control the switching power converter 506. The switch control signal $CS_P$ controls the conductivity of switch 508 to control the primary current $i_P$ to meet the power demands of load 510. In at least one embodiment, switch 508 is a field effect transistor (FET), and the switch control signal $CS_P$ controls conductivity of the switch 508. In at least one embodiment, switch 508 is configured as a source-follower, and the switch control signal $CS_P$ controls a source of the switch 508. In at least one embodiment, switch control signal $CS_P$ controls an input terminal, such as a gate terminal, of switch 508 to control conductivity of the switch 508.

The switch 508 controls flow of a primary current $i_P$ through the primary coil 510 of transformer 512. The transformer transfers energy from the primary coil 510 to the secondary coil 514 to generate a secondary-side current $i_S$. The load 516 draws the secondary-side current $i_S$. In at least one embodiment, the load 516 is an electronic lamp that includes one or more electronic lights such as one or more of light emitting diodes (LEDs) 518 or a compact fluorescent lamp (CFL) (not shown).

The particular implementation of controller 504 is a matter of design choice. In at least one embodiment, controller 504 is an integrated circuit and includes a processor (not shown) and a memory (not shown). In at least one embodiment, the controller 504 is implemented utilizing discrete analog and/or digital components or a combination of an integrated circuit and discrete analog and/or digital components.

Figure 2:
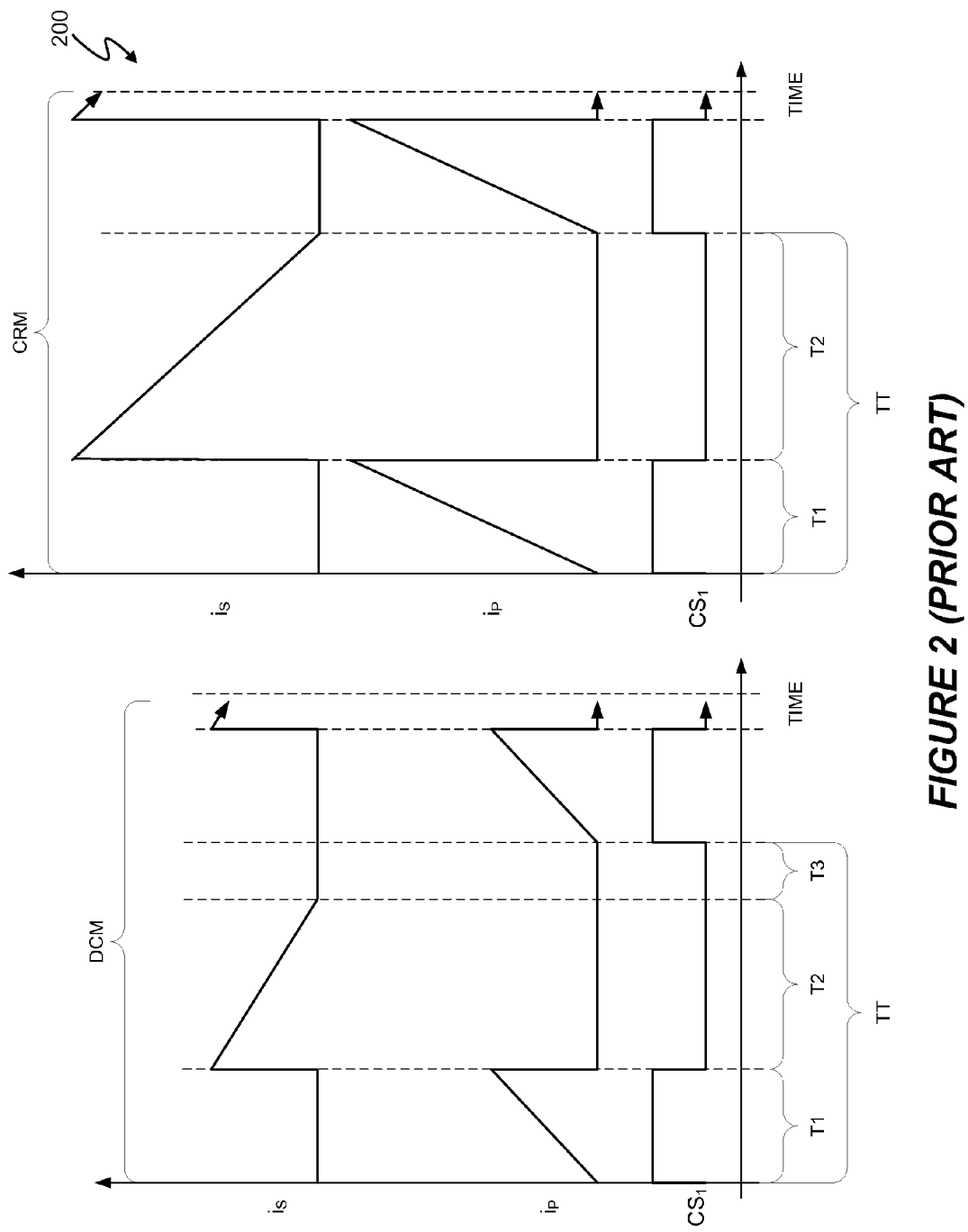
FIGS. 2 and 3 (labeled prior art) depict waveforms associated with the electronic system of FIG. 1.
Figure 3:
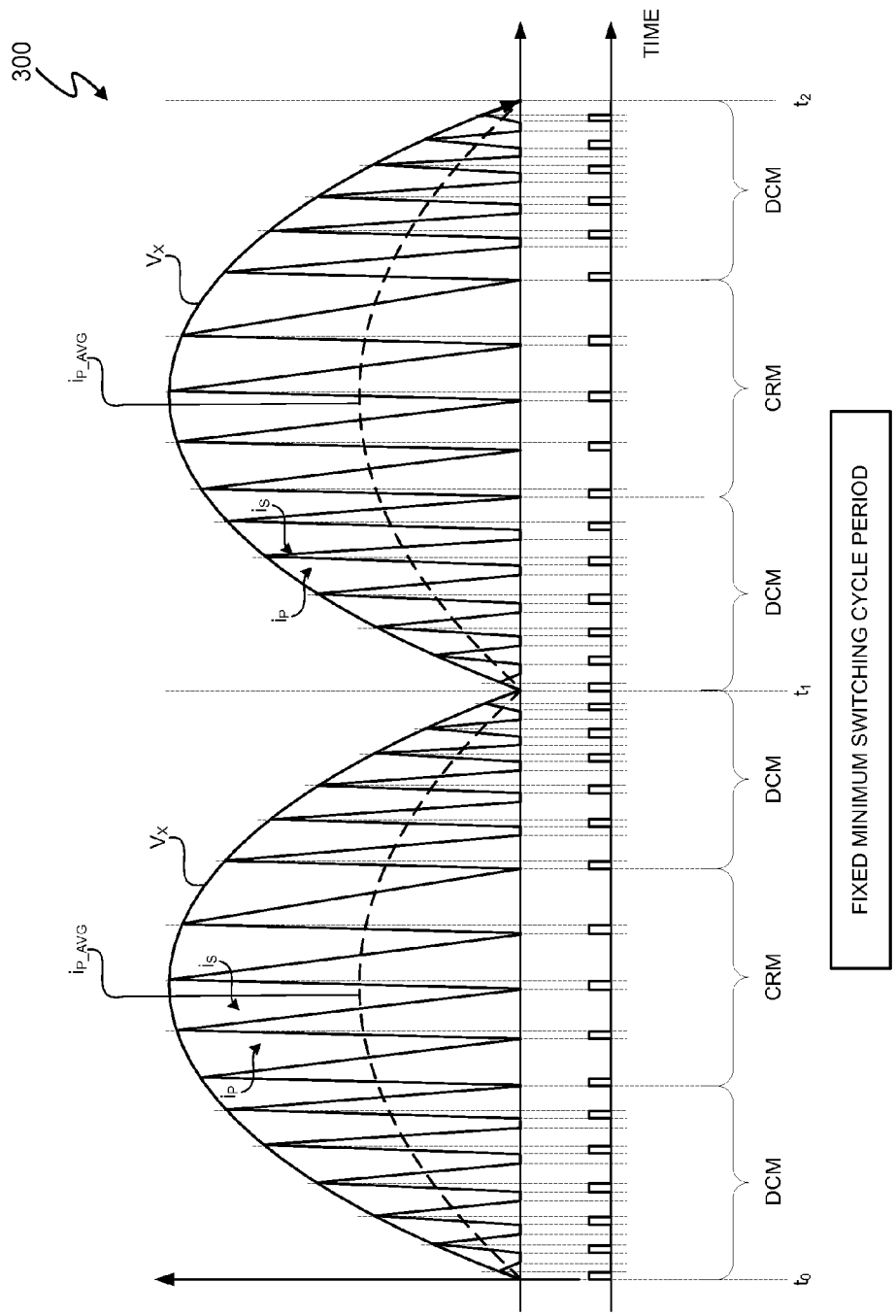
Figure 4:
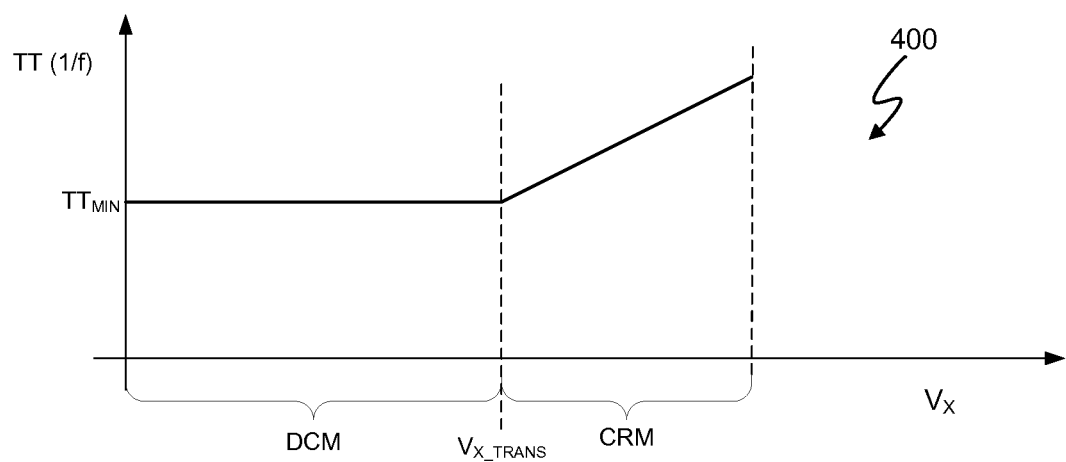
FIG. 4 (labeled prior art) depicts a minimum switch control signal period and transition between DCM and CRM operations of the electronic system of FIG. 1.
Figure 6:
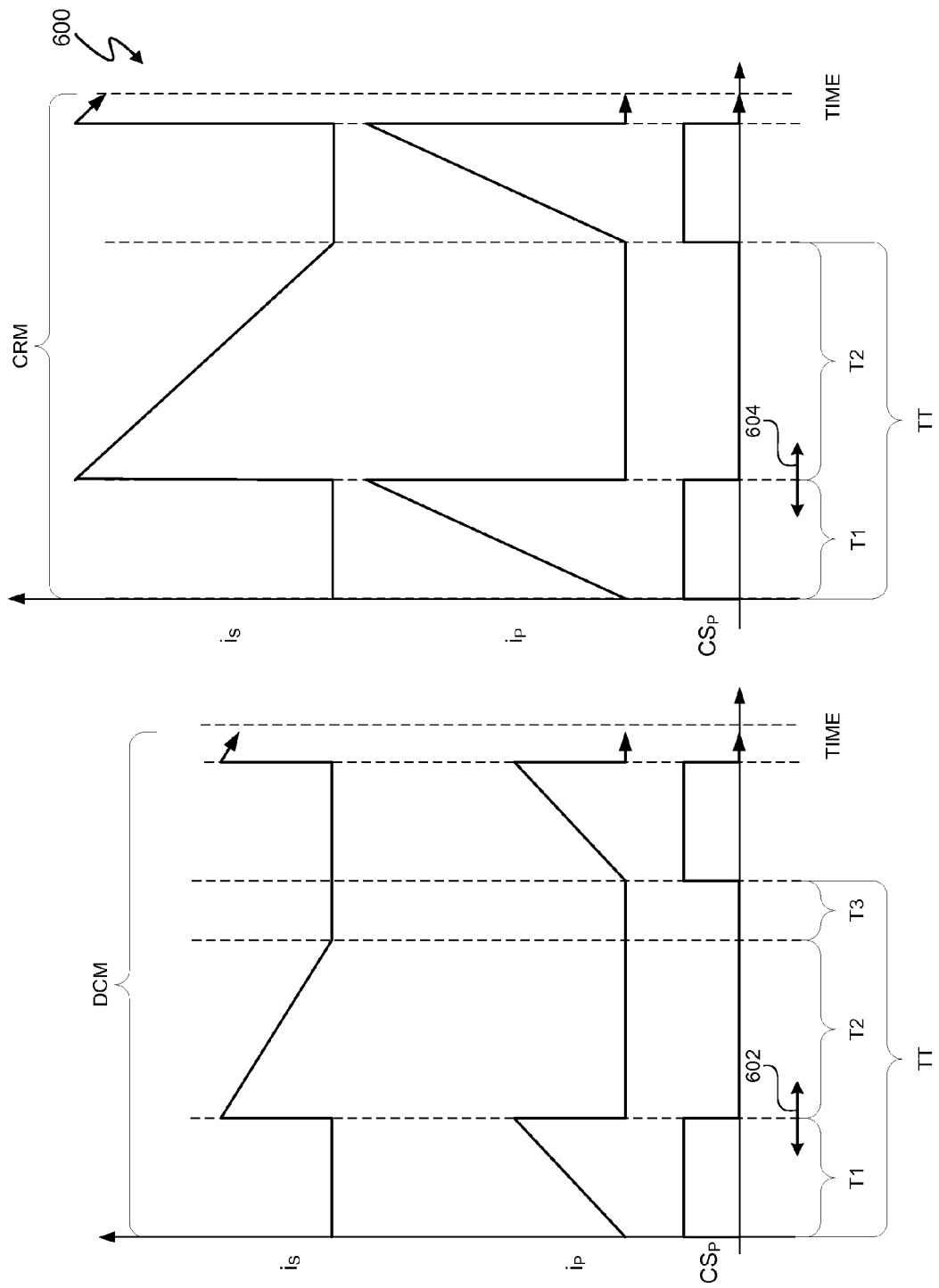
FIGS. 6 and 7 depict waveforms associated with the electronic system of FIG. 5.

FIG. 6 depicts waveforms 600 associated with the electronic system 500. The waveforms 600 depict exemplary DCM and CRM waveforms. As previously described with reference to FIG. 2, DCM includes a charging period T1, a flyback period T2, an idle period T3, and then repeats with the next charging period T1. CRM includes a charging period T1, a flyback period T2, and immediately begins a next charging period T1 at the end of the flyback period T2. However, waveforms 600, the transition frequency between DCM and CRM operation is dynamically determined by the dynamic DCM-CRM transition determination module 502 (FIG. 5)

which, in at least one embodiment, alters the transition frequency in accordance with a maximum flyback period during a cycle of the switch control signal $CS_P$ as indicated by arrows 602 and 604.

Figure 7:
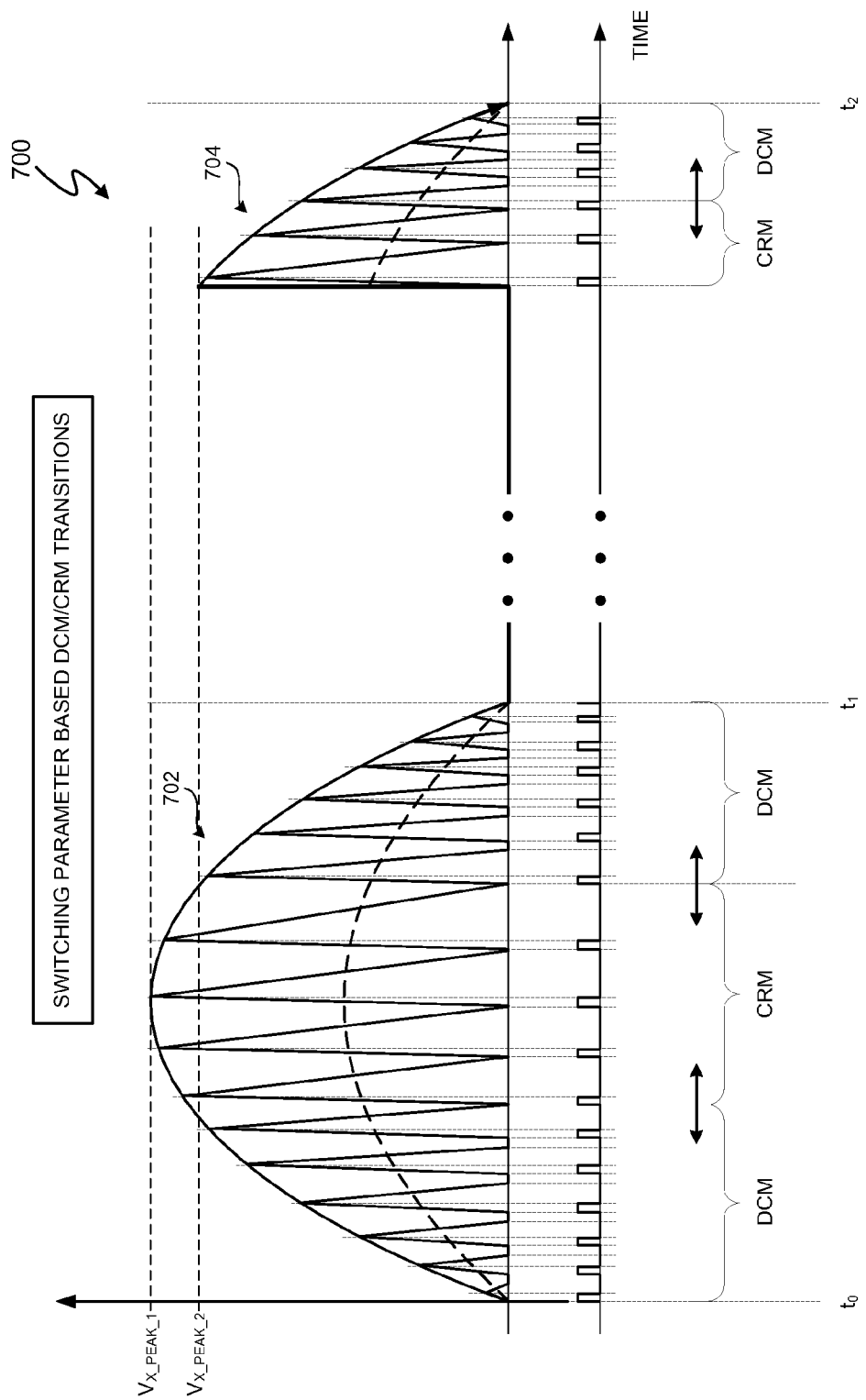

FIG. 7 depicts exemplary waveforms 700 associated with an embodiment of the electronic system 500 for two cycles of the rectified input voltage $V_X$, i.e. for two half-line cycles of the supply voltage $V_{SUPPLY}$. The waveforms 700 includes superimposed waveforms for the rectified input voltage $V_X$, a representative primary current $i_P$, and representative secondary current $i_S$. The waveforms 700 also include a representative depiction of the switch control signal $CS_P$. The term "representative" is used because typically the frequency of the switch control signal $CS_P$ is 20 kHz to 100 kHz and the frequency of the rectified input voltage $V_X$ is 100 Hz to 120 Hz. Thus, for clarity, only a subset of the pulses of the switch control signal $CS_P$ and resulting primary current $i_P$ and secondary current $i_S$ waveforms are shown in the waveforms 700. The first line cycle 702 of the rectified input voltage $V_X$ represents an exemplary non-phase cut cycle. The second line cycle 704 represents an exemplary approximately 135° phase cut of the 180° rectified input voltage $V_X$.

Referring to FIGS. 5, 6, and 7, the controller 504 controls the switching power converter 506 to provide power factor correction, regulates the primary side current $i_P$, and dynamically determines a DCM-CRM transition frequency. To provide power factor correction, the controller 504 generates the switch control signal $CS_P$ to make the switching power converter 506 and EMI filter 108 appear resistive to the voltage supply 508 and, thus, create a linear relationship between the average primary current $i_P$ and the rectified input voltage $V_X$. Thus, as the voltage $V_X$ rises at the beginning of the first charging period T1, the controller 506 generates a pulse of the switch control signal $CS_P$. The average primary current $i_P$ rises during the charging period T1 in correlation with a near instantaneous value of the rectified input voltage V. The controller 504 also monitors the secondary current $i_S$ and, thus, the flyback period T2 via the secondary sensing circuit 522 to determine the power demand of load 516. The secondary sensing circuit 522 generates an output signal T2_SENSE that represents the secondary side current $i_S$. The process of regulating the secondary side current $i_S$ is a matter of design choice. In at least one embodiment and as subsequently described, controller 504 regulates the secondary current $i_S$ in accordance with a target amount of charge to be delivered to the load 516 compared to an actual calculated amount of charge delivered to the load 516.

As previously discussed, the charging period T1 and the flyback period T2 are shorter nearer to the zero crossings of the rectified input voltage $V_X$. Thus, for efficiency, the controller 504 operates the switching power converter 506 in DCM at lower values of the rectified input voltage $V_X$ and in CRM at higher values of the rectified input voltage $V_X$.

In at least one embodiment, the switching power converter 506 operates in dual DCM and CRM mode, and the DCM-CRM transition determination module 502 dynamically determines the transition between DCM and CRM. In at least one embodiment, the dynamic DCM-CRM transition determination module 502 dynamically determines a minimum non-conductive time ($T2_{DYN\_MIN}$+T3) of the switch 508 for a period of the switch control signal $CS_P$. The minimum non-conductive time ($T2_{DYN\_MIN}$+T3) of the switch 508 equals a dynamically determined minimum flyback time $T2_{DYN\_MIN}$ plus the idle time T3. The switch control signal generator 524 then controls the switch 508 to enforce the minimum non-conductive time ($T2_{DYN\_MIN}$+T3) per period of the switch control signal $CS_P$. When the period TT of the switch control signal $CS_P$ transitions from greater than T1+($T2_{DYN\_MIN}$+T3) to equal to T1+($T2_{DYN\_MIN}$+T3), the switch control signal generator 524 operates the switching power converter 506 in DCM. When the period TT of the switch control signal $CS_P$ transitions from T1+($T2_{DYN\_MIN}$+T3) to less than T1+($T2_{DYN\_MIN}$+T3), the switch control signal generator 524 operates the switching power converter 506 in CRM. Thus, the switching power converter 506 operates in dual DCM and CRM mode with the DCM-CRM transition determination module 502 dynamically determining the transition between DCM and CRM.

Figure 8:
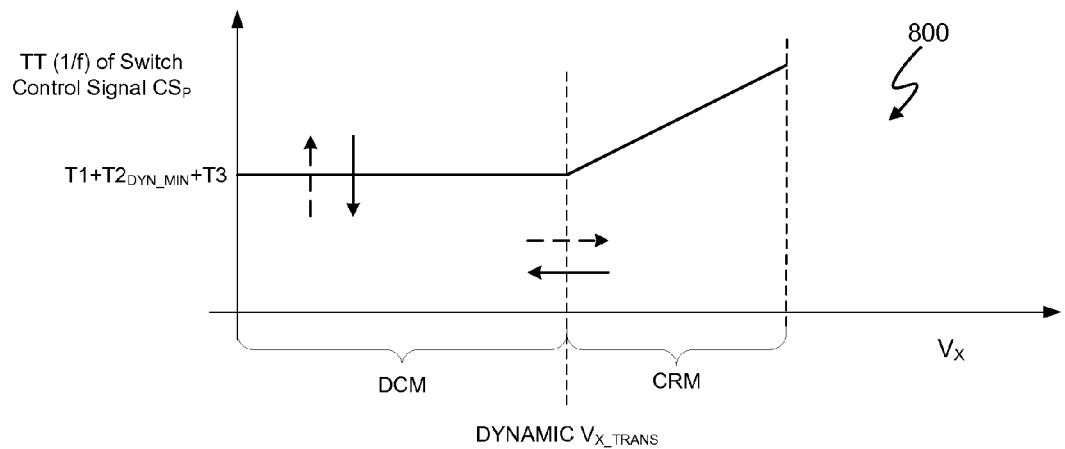
FIG. 8 depicts a DCM-CRM transition graph to illustrate an exemplary transition between DCM and CRM operations.

FIG. 8 depicts a DCM-CRM transition graph 800 to illustrate an exemplary transition between DCM and CRM operations of the switching power converter 506 and the relationship between the period TT of the switch control signal $CS_P$ and the rectified input voltage $V_X$. If the DCM-CRM transition determination module 502 increases the minimum non-conductive time ($T2_{DYN\_MIN}$+T3), the period TT of the switch control signal $CS_P$ at which the DCM-CRM transition occurs and the transition voltage $V_{X\_TRAN}$ also increase. Conversely, if the DCM-CRM transition determination module 502 decreases the minimum non-conductive time ($T2_{DYN\_MIN}$+T3), the period TT of the switch control signal $CS_P$ at which the DCM-CRM transition occurs and the transition voltage $V_{X\_TRAN}$ also decrease.

Figure 9:
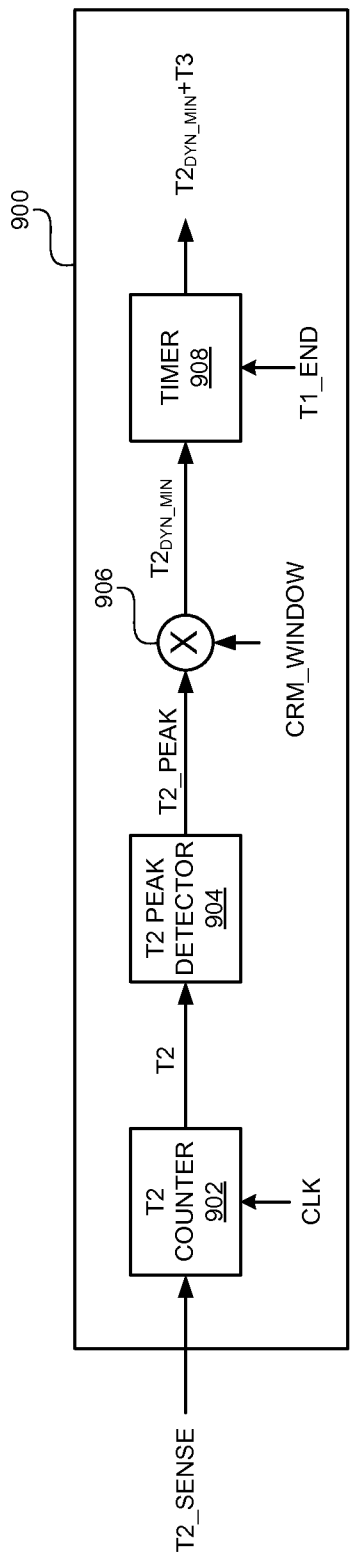
FIG. 9 depicts a DCM-CRM transition determination module.

FIG. 9 depicts a DCM-CRM transition determination module 900, which represents one embodiment of DCM-CRM transition determination module 502. The T2 counter 902 receives the input signal T2_SENSE from the secondary sensing circuit 522 (FIG. 5). The T2_SENSE input signal is similar to a square wave and decays sinusoidally at an end of the flyback period T2. Thus, when value of T2_SENSE decreases from a peak value to approximately zero, T2_SENSE indicates an end of the flyback period T2. The T2 counter 902 receives the T2_SENSE signal and utilizes a clock signal CLK to determine the duration of the flyback period T2 by counting from when the T2_SENSE signal transitions from zero to a positive value until the value of T2_SENSE decreases to zero. The T2 counter 902 provides the value of the count as the measured flyback period time T2 that occurs at approximately a peak voltage of the time-varying rectified input voltage $V_X$. Thus, in at least one embodiment, the measured switching time parameter value used by the controller 504 to control transitions between DCM and CRM of the switching power converter 506 is the flyback time T2 that occurs at approximately a peak voltage of the time-varying rectified input voltage $V_X$. In other embodiments, a measured switching time parameter such as the measured flyback period T2 time used to control the DCM-CRM transitions corresponds with a time-varying voltage, such as the rectified input voltage $V_X$, but does not necessarily occur at the time of the peak time-varying voltage. For example, the measured switching time parameter can be measured at a time other than at approximately the peak of the time varying voltage and scaled to a value that corresponds with an approximately peak voltage of a time-varying supply voltage supplied to the switching power converter 506.

The T2 peak detector 904 receives the flyback duration output signal T2 and determines a peak (i.e. maximum) value of T2 when a current value T2(n) is less than a previous value T2(n−1) for a then-current cycle of the rectified input voltage $V_X$. "n" is an index reference. The T2 peak detector 904 generates a T2_PEAK output signal representing the peak flyback value for the then current cycle of the rectified input voltage $V_X$.

The DCM-CRM transition determination module 900 then generates a minimum flyback value $T2_{DYN\_MIN}$. The process and parameters used to generate a minimum flyback value $T2_{DYN\_MIN}$ is a matter of design choice. In at least one embodiment, the DCM-CRM transition determination module 900 multiplies the T2_PEAK value by a value CRM_WINDOW. When multiplied by the T2_PEAK value, the value of CRM_WINDOW establishes the minimum $T2_{DYN\_MIN}$ and, thus, establishes a window for CRM operation by controller 504 (FIG. 5). The particular value of CRM_WINDOW is a matter of design choice. In at least one embodiment, the choice of the value of CRM_WINDOW is set based on the effect of CRM_WINDOW on EMI, total harmonic distortion, and ease of calculation. In at least one embodiment, the value of CRM_WINDOW is less than 1 and greater than 0.125. In at least one embodiment, the value of the CRM_WINDOW is a constant, such as 0.75. CRM_WINDOW equal to 0.75 has been found to provide a good balance between CRM efficiency at higher values of the rectified input voltage $V_X$ and DCM lower switching frequencies at lower values of the rectified input voltage $V_X$. The DCM-CRM transition determination module 900 includes a timer 908 that receives a signal T1_END, which indicates an end of the charging period T1. Once the charging period T1 ends, the $T2_{DYN\_MIN}$ value becomes valid. The timer 908 also adds an idle period T3 to $T2_{DYN\_MIN}$ to generate the minimum non-conductive time of the switch control signal $CS_P$. The value of T3 is a matter of design choice. In at least one embodiment, the value of T3 is set so that the charging cycle begins at an approximately lowest value of a voltage across the switch 508. For example, if switch 508 is a FET, parasitics can create a resonant drain-to-source voltage. The period T3 provides an idle time to allow the drain-to-source voltage to decrease so that the charging period T1 begins at an approximately lowest drain to source voltage.

The period TT of the switch control signal $CS_P$ and the flyback period of the secondary side current $i_S$ are mathematically related by TT=T1+T2+T3. In at least one embodiment, the flyback period T2 is sensed by the secondary sensing circuit 522 (FIG. 5) and the values of T1 and T3 are determined by the controller 504. Thus, it will be appreciated by those of ordinary skill in the art that in another embodiment, DCM-CRM transition determination module 900 could dynamically limit the period TT of the switch control signal $CS_P$ to have the same effect on the transition between DCM and CRM.

Figure 10:
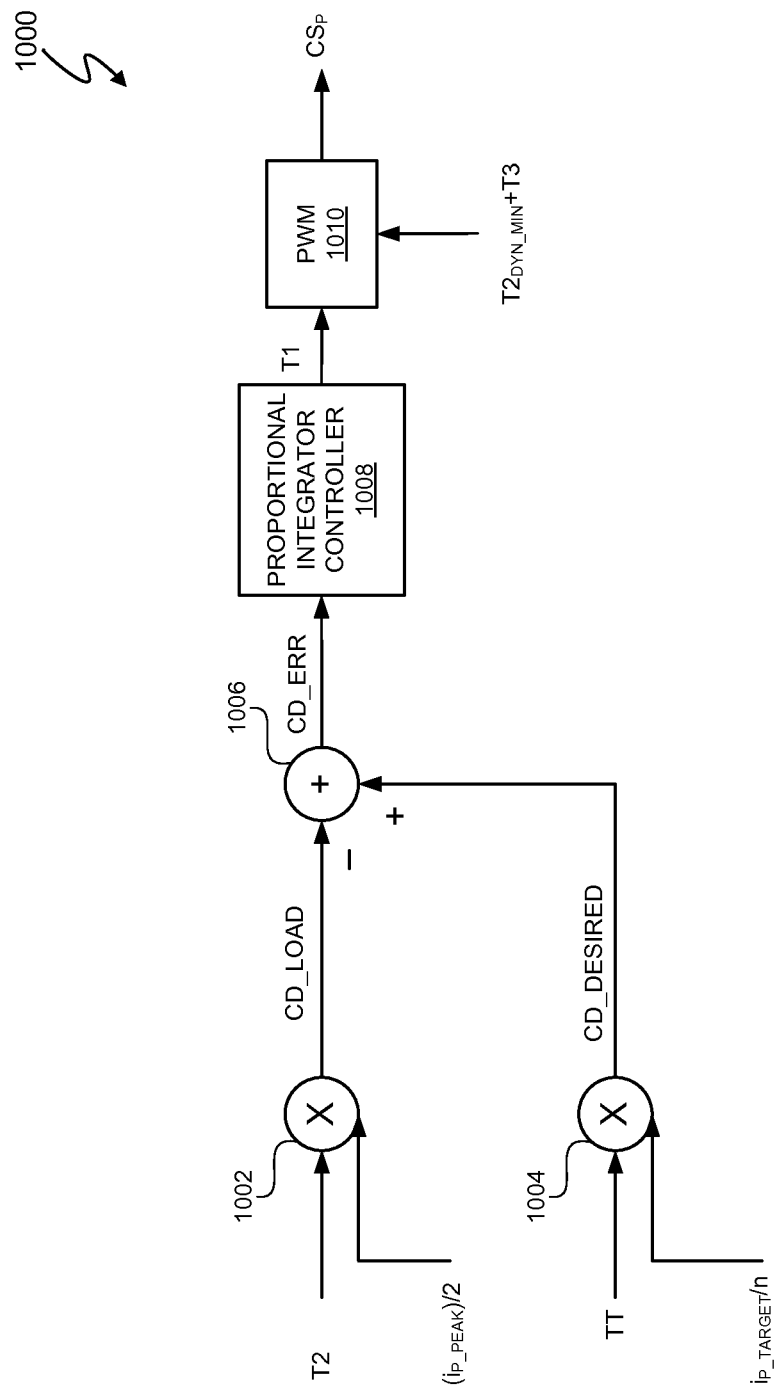
FIG. 10 depicts a switch control signal generator.

FIG. 10 depicts a switch control signal generator 1000, which represents one embodiment of the switch control signal generator 524 of FIG. 5. The switch control signal generator 1000 determines the charge delivered CD_LOAD to the load 516 by multiplying the flyback time T2 for the previous cycle of the switch control signal $CS_P$ times one-half of $i_{P\_PEAK}$, CD_LOAD with the multiplier 1002. In at least one embodiment, "$i_{P\_PEAK}$" represents a target value of a primary current ip at the end of the charging period T1. $T2 \cdot i_{P\_PEAK}/2$ represents the charge delivered to load 516. The switch control signal generator 1000 also determines a desired charge delivery CD_DESIRED to the load 516 by multiplying the period TT of the current cycle of the switch control signal $CS_P$ by $i_{S\_TARGET}/n$ with the multiplier 1004. "n" represents the turns ratio to one of the primary side coil 510 to the secondary side coil 514. "$i_{S\_TARGET}$" represents an average desired target current on the secondary side of the transformer 512, and $i_{S\_TARGET}/n$ converts the $i_{S\_TARGET}$ value into a primary side value for comparison with the primary side $i_{P\_PEAK}$ current value. The combiner 1006 compares the charge delivered to the load 516 to the desired charge delivered to the load 516 by subtracting the charge delivered to the load CD_LOAD from the desired charge delivered to the load CD_DESIRED to generate a charge delivery error signal CD_ERR. An average zero value of the charge delivery error signal CD_ERR indicates that the secondary side current $i_S$ is well regulated and the switching power converter 506 delivers a desired amount of power to the load 516. Thus, if the load 516 includes is a lamp, the lamp has a desired brightness.

A proportional integrator controller 1008 dampens the error signal CD_ERR and decreases the charging time T1 if the value of the charge delivery error signal CD_ERR is negative, which indicates that the actual charge delivered to the load 506 was greater than the target charge delivery. The proportional integrator controller 1008 increases the charging time T1 if the value of the error signal CD_ERR is positive, which indicates that the actual charge delivered to the load 506 was less than the target charge delivery. A pulse width modulator 1010 receives the minimum non-conduction time $T2_{DYN\_MIN}$+T3 of the switch 508 and the charging time T1. The pulse width modulator 1010 generates the switch control signal $CS_P$ in accordance with the charging time T1 while enforcing the minimum non-conduction time $T2_{DYN\_MIN}$+T3. In at least one embodiment, good power factor correction is obtained by maintaining T1 approximately constant in DCM operations.

The DCM-CRM transition determination module 900 and the switch control signal generator 1000 can be implemented using discrete analog and/or digital components, implemented as code stored in a memory and executable by a processor, or a combination of discrete and/or analog components and code.

Figure 11:
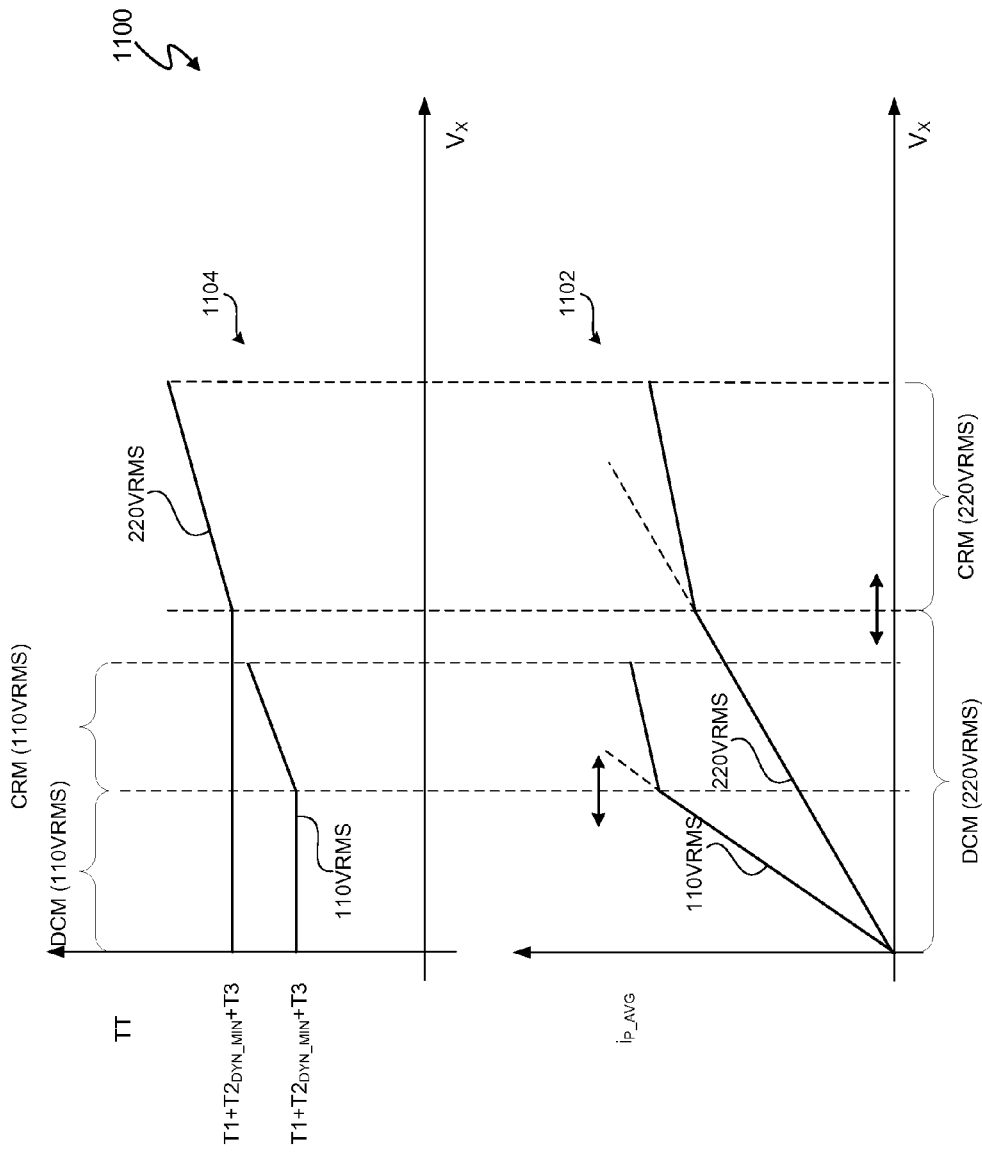
FIG. 11 depicts composite DCM-CRM transition graphs.

FIG. 11 depicts composite DCM-CRM transition graphs 1100 that include illustrative DCM-CRM transitions in terms of two different rectified input voltages $V_X$ relative to an average primary current $i_{P\_AVG}$ and switch control signal $CS_P$ period TT. Referring to FIGS. 5, 7, and 11, because the DCM-CRM transition determination module 900 uses the measured flyback time that occurs at approximately a peak voltage of the time-varying rectified input voltage $V_X$ to control transitions between DCM and CRM of the switching power converter 506, when the peak of rectified input voltage $V_X$ changes, the transition point between DCM and CRM operation also changes. In FIG. 6, the peak of rectified input voltage $V_X$ changes when the dimmer 104 is a leading edge dimmer and the phase cut angle is greater than 90°. For example, in FIG. 7, $V_{X\_PEAK\_1}$ is greater than $V_{X\_PEAK\_2}$, and, thus, the DCM-CRM transition determination module 900 determines that the transition point between DCM and CRM transition depicted by, for example, the non-conductive time of the switch control signal $CS_P$ decreases as the peak value of rectified input voltage $V_X$ decreases. In FIG. 11, to deliver the same amount of energy to load 516, the average peak current $i_{P\_AVG}$ increases with a decreasing peak rectified input voltage $V_X$. The DCM-CRM transition as indicated by the $i_{P\_AVG}$ v. $V_X$ graph 1102 and the switch control signal $CS_P$ period TT v. $V_X$ graph 1104 indicate a decrease in the transition point between DCM and CRM as the peak of rectified input voltage $V_X$ decreases, and, correspondingly, an increase in the transition point between DCM and CRM as the peak of rectified input voltage $V_X$ increases.

Figure 12:
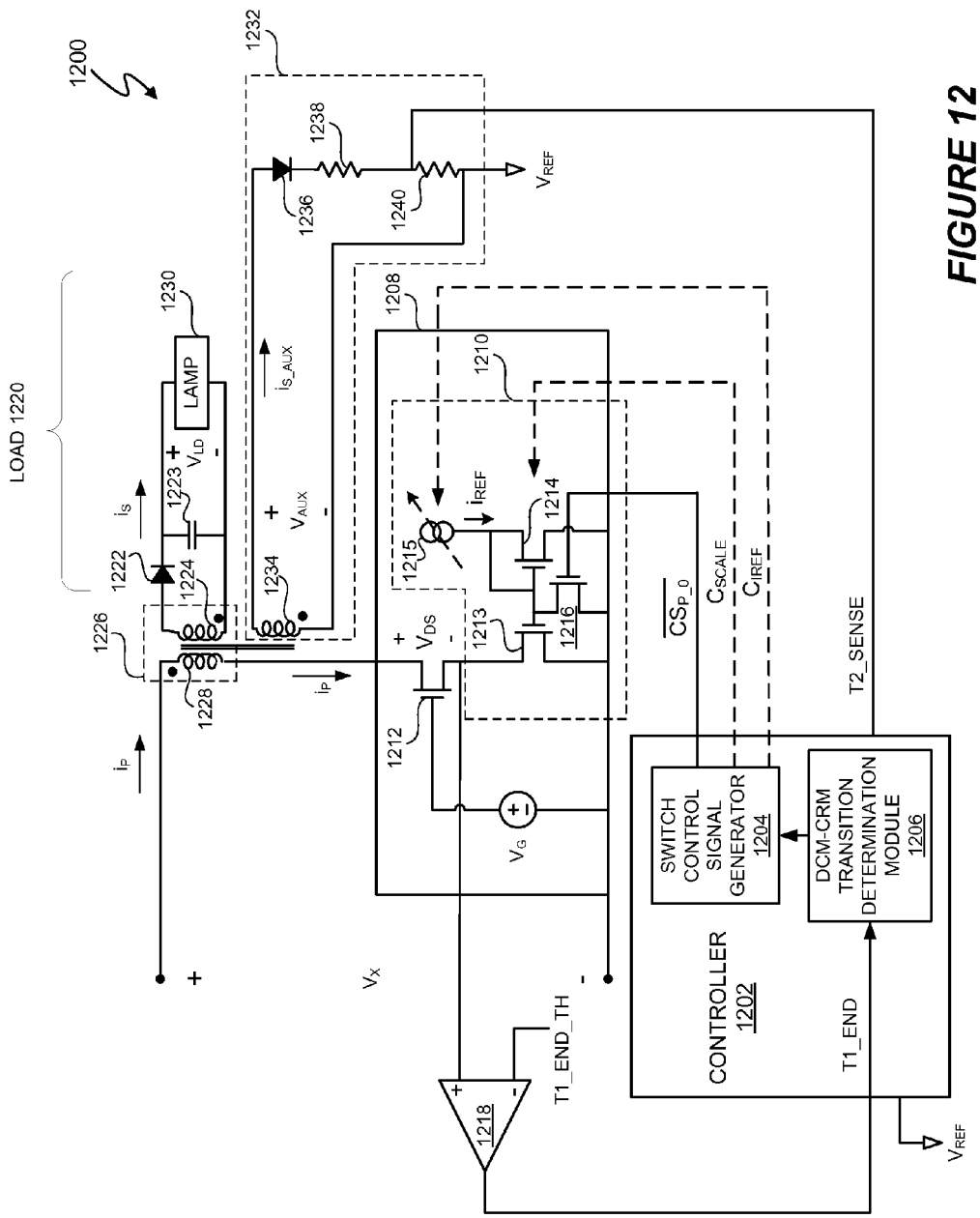
FIG. 12 depicts an electronic system that represents one embodiment of the electronic system of FIG. 5.

FIG. 12 depicts an electronic system 1200, which represents one embodiment of the electronic system 500. The electronic system 1200 includes controller 1202 with switch control signal generator 1204 and DCM-CRM transition determination module 1206, which represents respective embodiments of controller 504, switch control signal generator 524 and DCM-CRM transition determination module 502. Switch 1208 represents one embodiment of switch 508.

In general, electronic system 1200 controls a peak value $i_{P\_PEAK}$ of the primary current $i_P$ using a source follower control FET 1212 and a current limiter 1210. The current limiter 1210 limits the primary current $i_P$ to a peak value $i_{P\_PEAK}$ as established by the signals $C_{SCALE}$ and/or $C_{IREF}$. The switch control signal generator 1204 controls the peak primary current $i_{P\_PEAK}$ by scaling a current mirror of current limiter 1210 using the scaling signal $C_{SCALE}$ and/or by controlling a reference current $i_{REF}$ for the current mirror using the current reference control signal $C_{IREF}$. FETs 1213 and 1214 implement the current mirror. In at least one embodiment, the FETs 1212 and/or 1214 are implemented using multiple, parallel connected FETs (not shown). In at least one embodiment, the scaling factor control signal $C_{SCALE}$ changes the number of FETs used to implement FETs 1212 and/or 1214 and, thus, changes the scaling factor. For example, in at least one embodiment, one FET is used to implement FET 1212 and 200 FETs identical to the one FET used to implement FET 1212 are used to implement FET 1214, which provides a scaling factor of 200. By disabling one or more of the FETs used to implement FET 1214, the switch control signal generator 1204 varies a scaling factor Z. The current reference control signal $C_{IREF}$ controls the value of the reference current $i_{REF}$ generated by the current source 1215.

The switch control signal generator 1204 controls the conductivity of FET 1212 by controlling the conductivity of FET 1216 using the switch control signal $CS_{P\_0}$. FET 1212 has a fixed gate bias voltage $V_G$, which is +12V in at least one embodiment. Switch control signal $\overline{CS_{P\_0}}$ is an inverted version of switch control signal $CS_P$ in FIG. 6. When FET 1216 is OFF, FET 1212 conducts until the primary current $i_P$ approximately equals $i_{REF}*Z$. Since switch control signal generator 1204 can control the value of $i_{REF}$ and/or Z, switch control signal generator 1204 sets the peak primary current $i_{P\_PEAK}$. When FET 1216 is ON, FET 1212 turns OFF, and the primary current $i_P$ stops flowing through the primary coil 1228 of the transformer 1226. Transformer 1226 represents one embodiment of the transformer 512.

Comparator 1218 compares the source voltage of FET 1212 with a threshold voltage T1_END_TH. At the end of the charging period T1, the actual primary current $i_P$ reaches the set primary current $i_{P\_PEAK}$. When the actual primary current $i_P$ reaches the peak primary current $i_{P\_PEAK}$ set by switch control signal generator 1204, the source voltage of FET 1212 begins to rapidly increase. Comparator 1218 compares the source voltage of FET 1212 with a threshold voltage T1_END_TH. When the source voltage of FET 1212 is greater than the threshold voltage T1_END_TH, the primary current $i_P$ has reached the peak current value $i_{P\_PEAK}$, which indicates an end of the charging period T1. The threshold voltage T1_END_TH is set so that when the source voltage of FET 1212 is above the threshold voltage T1_END_TH, the output signal T1_END becomes a logical 1 indicating an end of the charging period T1. The particular value of the threshold voltage T1_END_TH is a matter of design choice and is, for example, +5V.

Load 1220 represents one embodiment of load 516 (FIG. 5). Load 1220 includes a flyback diode 1222 to prevent the load capacitor 1222 from discharging through the secondary coil 1224 of the transformer 1226. The secondary current $i_S$ charges the load capacitor 1223 to a load voltage $V_{LD}$ for lamp 1230. In at least one embodiment, lamp 1230 includes one or more LEDs and/or one or more fluorescent bulbs.

Secondary sensing circuit 1232 represents one embodiment of secondary sensing circuit 522 (FIG. 5). The secondary sensing circuit 1232 allows the DCM-CRM transition determination module 1206 to detect an end of the flyback period T2. The secondary sensing circuit 1232 includes an auxiliary winding 1234 coupled to the transformer 1226. The transformer 1226 induces an auxiliary voltage $V_{AUX}$ across the auxiliary winding 1234 that corresponds to a voltage across the secondary winding 1224. The flyback diode 1236 prevents a secondary auxiliary current $i_{S\_AUX}$ from reversing through the auxiliary winding 1234. The secondary auxiliary current $i_{S\_AUX}$ develops a voltage T2_SENSE across voltage divider resistances 1238 and 1240. The voltage T2_SENSE, thus, directly tracks the secondary current $i_S$. Accordingly, the voltage T2_SENSE indicates a beginning of the flyback period T2 when the voltage quickly rises and indicates an end of the flyback period T2 when the voltage T2_SENSE decreases to approximately 0V.

Figure 13:
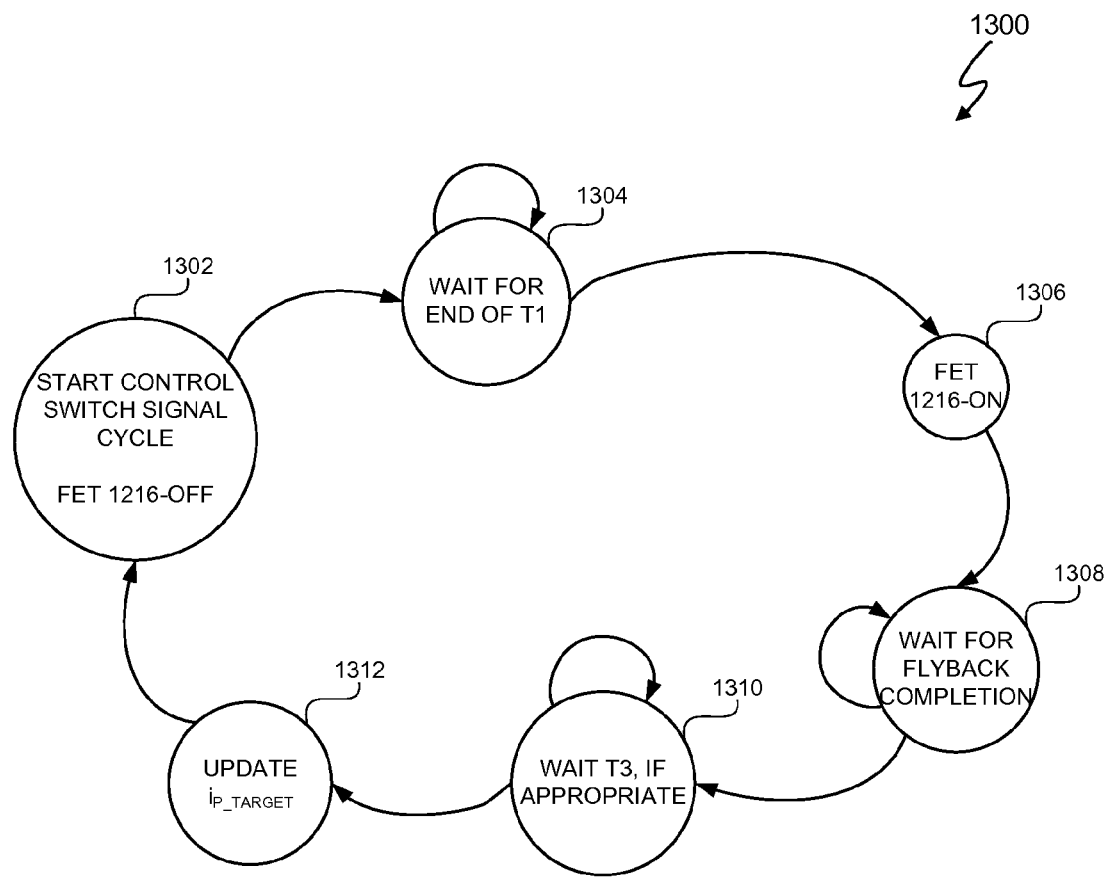
FIG. 13 depicts an exemplary state machine for the operation of a switch control signal generator of the electronic system of FIG. 12.

FIG. 13 depicts an exemplary state machine 1300 for the operation of switch control signal generator 1204. Referring to FIGS. 12 and 13, the state machine 1300 begins in state 1302 and sets the switch control signal $\overline{CS_{P\_0}}$ to a logical 0 to turn the FET 1216 OFF and allow the FET 1212 to conduct. When FET 1212 begins to conduct, the charging period T1 begins. State 1304 waits until the end of the charging state T1. The charging state T1 ends when the primary current $i_P$ reaches the peak primary current $i_{P\_PEAK}$ as set by the current limiter 1210. State 1306 turns the FET 1216 OFF to discharge the gate of FET 1213 and prevent FETs 1212 and 1213 from conducting during the flyback time T2 and the idle time T3. State 1308 waits from completion of the flyback period as indicated by the T2_SENSE signal decreasing to approximately 0V. State 1310 waits for an additional idle time T3 to, for example, allow the voltage $V_{DS}$ across FET 1212 to drop to a lowest value. State 1312 updates the target primary current $i_{PTARGET}$ to track the increasing values of the rectified input voltage $V_X$ and, thus, provide power factor correction. The state machine 1300 then repeats the state cycle beginning at state 1302.

Figure 14:
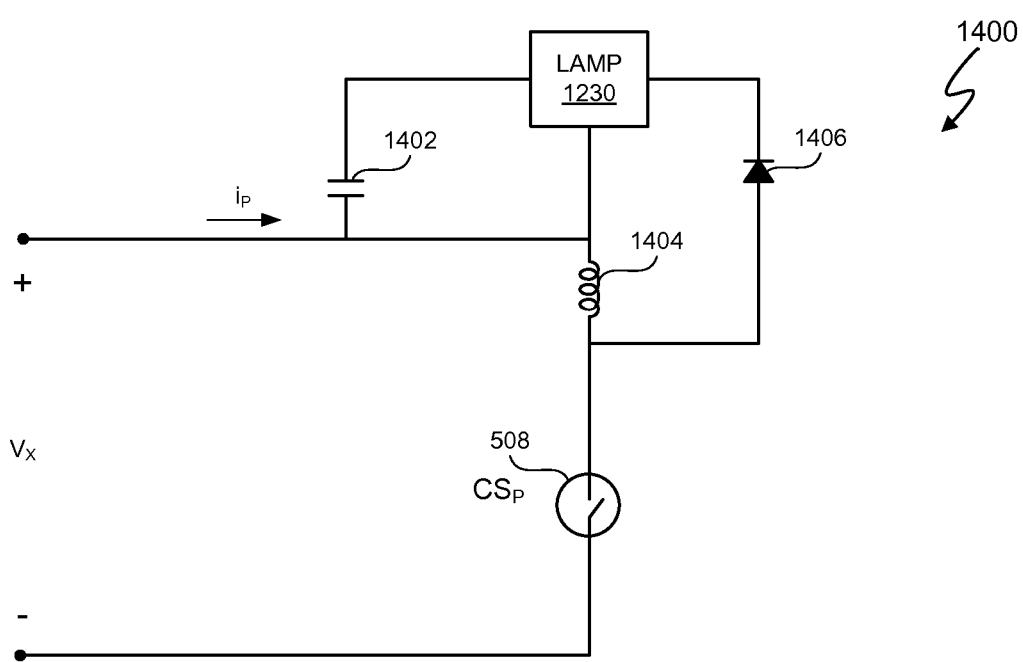
FIG. 14 depicts a boost/buck converter embodiment of the switching power converter of the electronic system of FIG. 5.

FIG. 14 depicts a boost/buck converter 1400 configured with a capacitor 1402, inductor 1404, and flyback diode 1406. The boost/buck converter 1400 represents one embodiment of the switching power converter 506. In at least one embodiment, the controller 504 controls the boost/buck converter 1400 in the same manner as previously described in conjunction with switching power converter 506.

Thus, an electronic system includes a controller to provide at least dual-mode conduction control of a switching power converter. The controller dynamically compensates for changing parameters of the electronic system by dynamically determining a minimum non-conductive time of the control switch of the switching power converter using the measured switching time parameter having a value corresponding with an approximately peak of the time varying supply voltage, such as the rectified input voltage $V_X$.

Although embodiments have been described in detail, it should be understood that various changes, substitutions, and alterations can be made hereto without departing from the spirit and scope of the invention as defined by the appended claims.

What is claimed is:

1. An apparatus comprising:
   a controller to provide at least dual-mode conduction control of a switching power converter, wherein the controller is configured to:
   control transitions between discontinuous conduction mode and critical conduction mode of the switching power converter using a measured switching time parameter having a value corresponding with an approximately peak voltage of a time-varying supply voltage supplied to the switching power converter.

2. The apparatus of claim 1 wherein (i) the controller is configured of controlling transfer of energy from a primary-side coil of the switching power converter to a secondary side coil, (ii) the measured switching time parameter value is a minimum flyback time of the secondary side coil corresponding to a fraction of a maximum flyback time for a particular cycle of the supply voltage, and (iii) the controller is configured to:
transition the switching power converter from discontinuous conduction mode to critical conduction mode when the flyback time is greater than the minimum flyback time; and
transition the switching power converter from critical conduction mode to discontinuous conduction mode when the flyback time is less than the minimum flyback time.

3. The apparatus of claim 1 wherein the switching power converter includes a switch to control power conversion, and the switching parameter comprises a non-conductive time of the switch corresponding to a flyback time of a secondary coil of a transformer.

4. The apparatus of claim 3 wherein to control the transitions between discontinuous conduction mode and critical conduction mode of the switching power converter the controller is configured to:
generate a switch control signal to control conductivity of the switch, wherein the switch control signal is periodic;
determine a flyback time of the secondary coil of the transformer;
detect a maximum flyback time of the secondary coil of the transformer;
determine a minimum non-conductive time of the switch for a period of the control signal, wherein the minimum non-conductive time of the switch is less than the maximum flyback time of the secondary coil of the transformer; and
control the switch to enforce the minimum non-conductive time of the switch per period of the switch control signal.

5. The apparatus of claim 4 wherein the controller is configured to control the switch of the switching power converter to:
transition from discontinuous conduction mode to critical conduction mode when power demand by a load coupled to the switching power converter results in the flyback time of the secondary coil exceeding the minimum flyback time.

6. The apparatus of claim 5 wherein the load comprises one or more light emitting diodes.

7. The apparatus of claim 5 wherein the load comprises one or more fluorescent bulbs.

8. The apparatus of claim 5 wherein the controller is configured of meeting the power demand of the load by setting the peak current in the primary side coil of the transformer for each cycle of the switch control signal during a half cycle of the supply voltage so that the charge delivered to the load meets the power demand of the load.

9. The apparatus of claim 4 wherein the controller is configured to control the switch of the switching power converter to:
transition from critical conduction mode to discontinuous conduction mode when power demand by a load coupled to the switching power converter results in the flyback time of the secondary coil falling below the minimum flyback time.

10. The apparatus of claim 4 wherein to control a switch of the switching power converter to enforce the minimum non-conductive time of the switch per period of the switch control signal, the controller is configured to:
set a peak current in a primary side coil of the transformer for each cycle of the switch control signal.

11. The apparatus of claim 1 wherein the time-varying supply voltage is a rectified alternating current (AC) line voltage.

12. The apparatus of claim 1 wherein the measured switch time parameter has a value occurring at approximately a peak voltage of a time-varying supply voltage supplied to the switching power converter.

13. The apparatus of claim 1 wherein the measured switch time parameter has a value occurring at a non-peak voltage of a time-varying supply voltage supplied to the switching power converter.

14. A method comprising:
providing at least dual-mode conduction control of a switching power converter, wherein providing at least dual-mode conduction control of a switching power converter comprises:
controlling transitions between discontinuous conduction mode and critical conduction mode of the switching power converter using a measured switching time parameter having a value corresponding with an approximately peak voltage of a time-varying supply voltage supplied to the switching power converter.

15. The method of claim 14 further comprising:
controlling transfer of energy from a primary-side coil of the switching power converter to a secondary side coil, wherein the measured switching time parameter value is a minimum flyback time of the secondary side coil corresponding to a fraction of a maximum flyback time for a particular cycle of the supply voltage;
transitioning the switching power converter from discontinuous conduction mode to critical conduction mode when the flyback time is greater than the minimum flyback time; and
transitioning the switching power converter from critical conduction mode to discontinuous conduction mode when the flyback time is less than the minimum flyback time.

16. The method of claim 14 wherein the switching power converter includes a switch to control power conversion, and the switching parameter comprises a non-conductive time of the switch corresponding to a flyback time of a secondary coil of a transformer.

17. The method of claim 16 wherein controlling the transitions between discontinuous conduction mode and critical conduction mode of the switching power converter further comprises:
generating a switch control signal to control conductivity of the switch, wherein the switch control signal is periodic;
determining a flyback time of the secondary coil of the transformer;
detecting a maximum flyback time of the secondary coil of the transformer;
determining a minimum non-conductive time of the switch for a period of the control signal, wherein the minimum non-conductive time of the switch is less than the maximum flyback time of the secondary coil of the transformer; and
controlling the switch to enforce the minimum non-conductive time of the switch per period of the switch control signal.

18. The method of claim 17 further comprising:
controlling a switch of the switching power converter to transition from discontinuous conduction mode to critical conduction mode when power demand by a load coupled to the switching power converter results in the flyback time of the secondary coil exceeding the minimum flyback time.

19. The method of claim 18 wherein the load comprises one or more light emitting diodes.

20. The method of claim 18 wherein the load comprises one or more fluorescent bulbs.

21. The method of claim 17 further comprising:
controlling a switch of the switching power converter to transition from critical conduction mode to discontinuous conduction mode when power demand by a load coupled to the switching power converter results in the flyback time of the secondary coil falling below the minimum flyback time.

22. The method of claim 17 wherein controlling the switch to enforce the minimum non-conductive time of the switch per period of the switch control signal further comprises:
setting a peak current in a primary side coil of the transformer for each cycle of the switch control signal.

23. The method of claim 14 wherein the controller is configured of meeting the power demand of the load by setting the peak current in the primary side coil of the transformer for each cycle of the switch control signal during a half cycle of the supply voltage so that the charge delivered to the load meets the power demand of the load.

24. The method of claim 14 wherein the time-varying supply voltage is a rectified alternating current (AC) line voltage.

25. The method of claim 14 wherein the measured switch time parameter has a value occurring at approximately a peak voltage of a time-varying supply voltage supplied to the switching power converter.

26. The method of claim 14 wherein the measured switch time parameter has a value occurring at a non-peak voltage of a time-varying supply voltage supplied to the switching power converter.

27. An apparatus comprising:
a switching power converter;
a controller, coupled to the switching power converter, to provide at least dual-mode conduction control of the switching power converter, wherein the controller is configured to:
control transitions between discontinuous conduction mode and critical conduction mode of the switching power converter using a measured switching time parameter having a value corresponding with an approximately peak voltage of a time-varying supply voltage supplied to the switching power converter; and
control power factor correction for the switching power converter; and
a load coupled to the switching power converter.

28. The apparatus of claim 27 wherein the load comprises one or more members of a group consisting of: one or more light emitting diodes and one or more fluorescent bulbs.

* * * * *